United States Patent [19]

Gord et al.

[11] Patent Number: 4,975,309
[45] Date of Patent: Dec. 4, 1990

[54] CURVED TUBULAR PACKING CASING

[75] Inventors: Herbert Gord, Ingelheim; Hoang Pho Tu, Eppstein; Manfred Siebrecht, Wiesbaden-Naurod; Reinhold Becker, Weisbaden, all of Fed. Rep. of Germany

[73] Assignee: Hoechst Aktiengesellschaft, Frankfurt am Main, Fed. Rep. of Germany

[21] Appl. No.: 339,663

[22] Filed: Apr. 18, 1989

[30] Foreign Application Priority Data

Apr. 19, 1988 [DE] Fed. Rep. of Germany ....... 3813044

[51] Int. Cl.$^5$ .................. F16L 11/00; A22C 13/00
[52] U.S. Cl. .................. 428/34.8; 138/118.1; 426/105; 426/135
[58] Field of Search ............ 138/118.1, 177; 426/105, 135; 428/34.8, 532

[56] References Cited

U.S. PATENT DOCUMENTS

| | | | |
|---|---|---|---|
| 2,136,566 | 11/1938 | Schnecko et al. | 18/57 |
| 2,925,621 | 2/1960 | Parth | 18/57 |
| 3,155,752 | 11/1964 | Riegler et al. | 264/95 |
| 3,950,469 | 4/1976 | Gneuss et al. | 264/95 |
| 4,081,562 | 3/1978 | Winkler | 426/390 |
| 4,356,201 | 10/1982 | Winkler | 426/138 |

FOREIGN PATENT DOCUMENTS

| | | |
|---|---|---|
| 2324065 | 1/1974 | Fed. Rep. of Germany . |
| 3416405 | 11/1984 | Fed. Rep. of Germany . |
| 3720034 | 6/1988 | Fed. Rep. of Germany . |
| 1397501 | 3/1965 | France . |
| 1431519 | 4/1976 | United Kingdom . |

Primary Examiner—James Seidleck
Attorney, Agent, or Firm—Foley & Lardner, Schwartz, Jeffery, Schwaab, Mack, Blumenthal & Evans

[57] ABSTRACT

A curved, tubular packing casing of unreinforced cellulose having non-uniform wall thickness in cross-section is disclosed. The area of minimum wall thickness lies opposite the area of maximum wall thickness and is situated in the area of the greater, outer radius of curvature. The maximum wall thickness lies in the range from about 50 to 160 μm, and the minimum wall thickness lies in the range from about 10 to 50 μm. The maximum wall thickness is 50 to 800% greater than the minimum wall thickness.

12 Claims, 2 Drawing Sheets

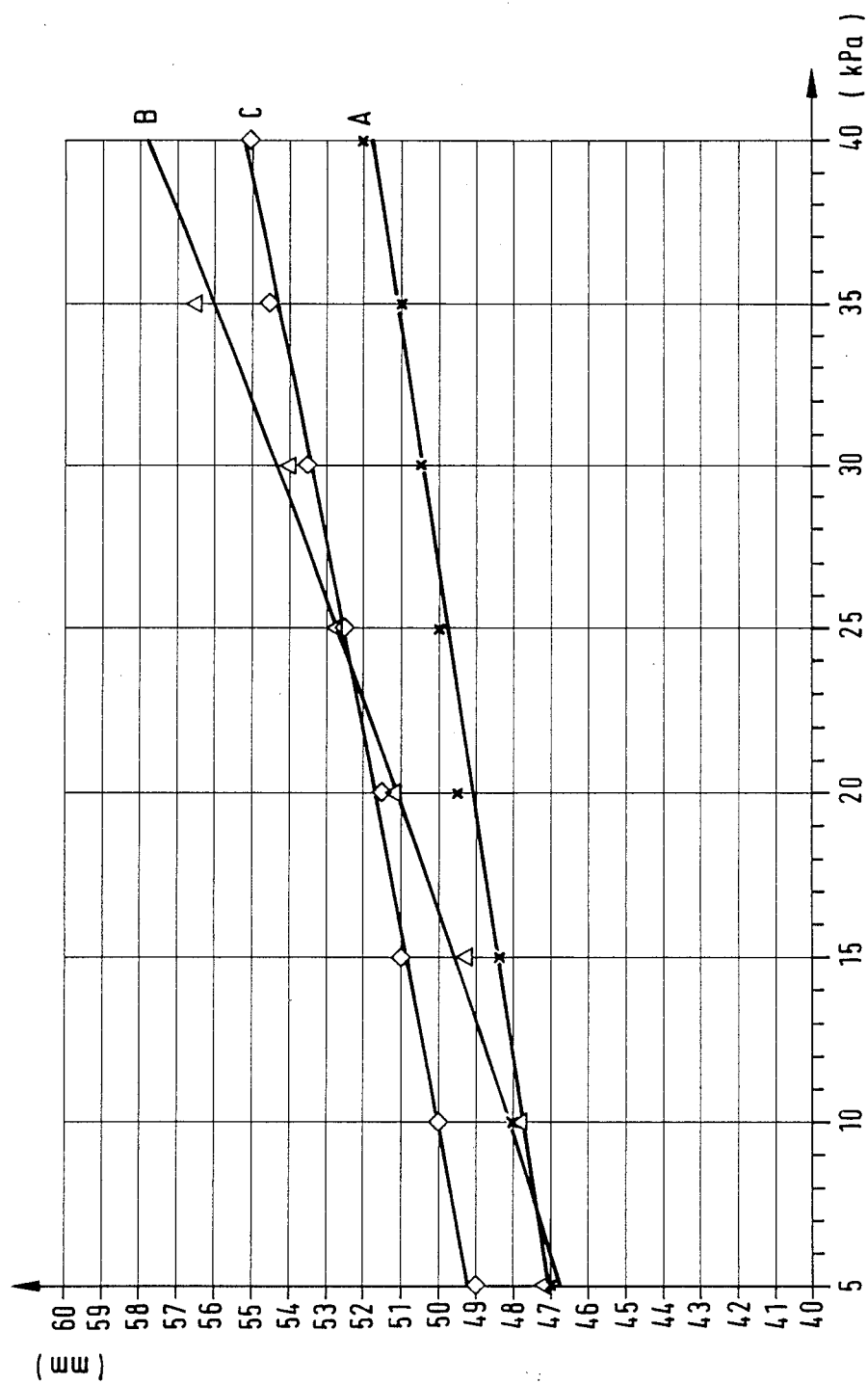

CURVED TUBULAR PACKING CASING

BACKGROUND OF THE INVENTION

The invention relates to a curved, ring-type or spiral tubular packing casing, in particular to an artificial sausage casing in the form of a so-called round, comprising unreinforced cellulose and to a method for its production in which viscose (cellulose xanthate) is converted into regenerated cellulose. The helically wound tube obtained after drying can be divided into individual curved or annular sections which, when used as artificial sausage casing, are filled with sausage meat and further processed.

Packing casings of this type have been known for a long time. They are produced by the viscose method in which the alkaline viscose solution is extruded through an annular slot die directly into an acid coagulation bath. The coagulated tube is converted into cellulose hydrate gel by treatment with acid regeneration liquid and is thereafter dried in the inflated state.

In order to produce the permanently curved tube form by the viscose method, the coagulated and regenerated tube of cellulose hydrate gel is dried in the inflated and spirally wound state. Thus, DE-C-667,016 (=US-A-2,136,566) describes a drying process in which the tube, spirally wound on a heated drum and inflated with air, is dried in two stages. First, the inner side of the tube in contact with the drum is dried, and thereafter the tube is dried on all sides with air until completely dry. Because of the one-sided drying, the inner side bearing on the drum shrinks to a greater extent than the outer side which is dried later. Due to the cellulose hardening in the heat, the tube assumes the permanently spiral shape. This method requires a high degree of servicing and is suitable only for non-continuous operation. The unfavorable material properties of the tube casing obtained are a further disadvantage.

In a further development the spiral form is produced on the coagulated and not yet completely regenerated tube. In this method, described in DE-C-932,713 (=US-A-2,925,621), the air-inflated, coagulated tube is passed helically over a drum-shaped support through a regeneration bath. The regenerated cellulose tube running off the support is permanently shaped. DE-C-1,163,701 (=US-A-3,155,752) describes a cylindrical support suitable for carrying out this method. According to the information in DE-C-932,713 the cellulose tube casings regenerated in spiral winding should have better dimensional stability and smaller ring diameters compared to those prepared according to DE-C-667,016 which obtain their spiral shape only by the one-sided shrinkage upon drying. However, the method of DE-C-932,713 has the disadvantage that production interruptions are necessary for removal of the reaction gases arising in the tube upon regeneration of the cellulose. The tube casings obtained show widely differing properties, in particular as regards bursting pressure, caliber (casing diameter), ring diameter, expansion behavior and strength. The strength of the casings is, moreover, inadequate. It does not permit the casings to be provided in the watered state with a metal clip. In order to prevent damage to these casings during tying-off, a special thread is required. When used as sausage casing for boiling sausage, undesired wrinkle formation and jelly deposition occur after only a short storage time. Wrinkled sausage casings are not only unattractive, but the wrinkled areas also prevent penetration of smoke upon smoking of the sausage.

It is furthermore known in the prior art to produce curved sausages with tube casings of thermoplastic material. Thus, according to DE-C-2,163,764 (=US-A-3,950,469) the molten plastic (polyethylene terephthalate) is extruded through a tubular die, with an eccentrically designed ring slot, to give a tube which, corresponding to the shape of the ring slot, has a non-uniform thickness over the periphery. The extruded tube is stretched biaxially, and subsequently further stretched monoaxially in the longitudinal direction. The synthetic tube obtained is not yet curved. Only when a sausage mixture is pressed in should the straight synthetic tube be given a curved form by the action of the filling pressure. The thin-walled half of the tube is expanded radially more easily than the thick-walled half of the tube. The result of this is that the tube is radially expanded predominantly in the area of the thin-walled half of the tube, which occurs at the expense of a partial reduction in the length of the tube. This reduction in the length of the thin-walled part of the tube brings about the curvature of the tube when the sausage mixture is pressed in.

DE-C-2,314,767 (=US-A-4,081,562) has disclosed a method for the production of a curved sausage casing of edible materials, in particular animal skin fiber compositions. In the example collagen is extruded through a tubular die with an eccentrically mounted pellet. By this means a tube casing is produced which is of nonuniform thickness over the periphery and which, as a result of the nonuniform width of the die gap, curves on emerging from the die. It is then filled with blown air, led off helically in uniform turns and dried, the thicker areas at all times being subjected to the greatest expansion. Sausage casings of this material are not suitable for a number of types of sausage because of the lack of transparency. Moreover, in order to increase their strength, these casings must be watered in common salt solutions. This leads to pollution of the waste water and to corrosion of the processing machines.

SUMMARY OF THE INVENTION

Accordingly, it is an object of the present invention to provide a curved or ring-shaped, unreinforced cellulose tube casing which displays increased and more uniform values for expansion, bursting pressure and strength.

Another object of the present invention is to provide a casing having uniform caliber and ring diameter.

A further object of the present invention is to provide a casing which is closable in the fully watered state using a metal clip.

In accomplishing the foregoing objectives, there has been provided, in accordance with one aspect of the present invention, a curved tubular packing casing, comprising unreinforced cellulose, which has a nonuniform peripheral wall thickness, wherein the area of the tube periphery having the greater wall thickness is situated in the region defined by the inner radius of curvature of the tube and the area of lesser wall thickness is situated opposite said area of greater wall thickness in the region defined by the outer radius of curvature of the tube, and wherein the maximum wall thickness is at least 50% greater than the minimum wall thickness.

In accordance with another aspect of the present invention there is provided a method for producing a curved tubular packing casing as described above, which comprises the steps of providing an alkaline viscose solution, extruding the solution into an acid coagulation liquid to form a tube which extends in a straight line and which has nonuniform peripheral wall thickness, wherein the areas of maximum and minimum peripheral wall thickness lie opposite each other, regenerating the tube to produce a straight tube of cellulose hydrate gel, spirally winding the tube around a support such that the area of maximum wall thickness is in contact with the support, inflating the tube, and drying the tube, whereby the length of the tube in said area of minimum wall thickness is increased by about 10 to 40%, based on the length of the tube before drying.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWING

The invention may be more readily understood by referring to the accompanying drawing in which FIG. 2 is a diagram showing the increase in caliber of packing casings with increasing internal pressure.

DETAILED DESCRIPTION OF THE PREFERRED EMBODIMENTS

Figure 1A:
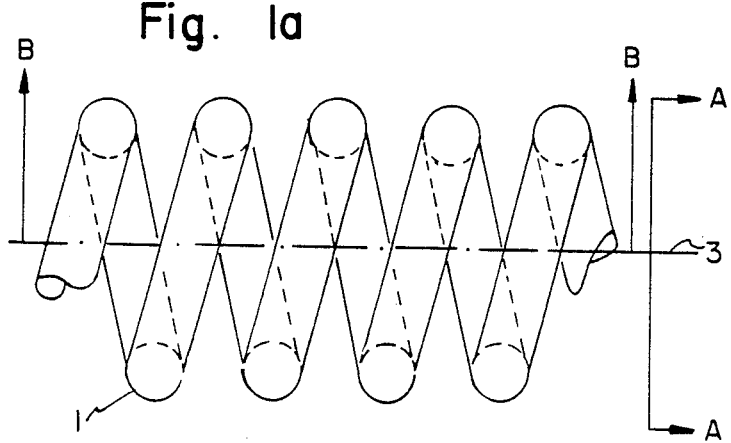
FIGS. 1a–c depict a casing according to the invention in a side view, down the longitudinal axis and in transverse cross-section, respectively.

The casing is curved in a sickle shape, preferably annular, i.e., in the shape of a ring. It can also consist of more than one ring and is then spiral. It comprises unreinforced cellulose. This is understood as a film of regenerated cellulose or cellulose hydrate which contains no fiber reinforcement and is consequently transparent or at least translucent. The transparency of the casing is especially high, and better than in the conventional curved casings of cellulose, on the outer half of the periphery through the middle of which the greater outer radius of curvature extends in the longitudinal direction of the tube. In this area the casing appears clear as glass, and the filling material can be seen perfectly clearly. However, it is also possible to color the film if desired. It then contains coloring pigments in the cellulose layer or is imprinted with a pattern. The cellulose layer contains a customary amount of a known plasticizer for cellulose, in particular a polyol such as glycerol, and has a water content o at least 5% by weight.

When used as a sausage casing it has if desired, on its inner side and/or outer side, the coatings customary in sausage casings of cellulose, for example an inner coating for improving the adhesion between the sausage mixture and the inner wall of the sausage casing, or an inner or outer layer of a polyvinylidene chloride copolymer (PVDC) which serves as a barrier layer against steam and oxygen, so that the sausage cannot dry out and a change in the sausage mixture as a result of the entry of oxygen is prevented, or an outer layer which contains a preserving agent such as sorbic acid.

The cellulose layer of the curved, tubular packing casing has different wall thicknesses in the cross-section transverse to the longitudinal axis. These wall thickness ratios remain practically constant over the length of the tube. The maximum area of the wall thickness lies in the area of its smaller, inner radius of curvature. The minimum area of the wall thickness lies diametrically opposite the maximum area of the wall thickness and thus in the area of the greater, outer radius of curvature. The wall thickness changes between the outer and inner radius of curvature so that a gradual transition results. A continuous transition from a maximum value to a minimum value of the wall thickness, and vice versa, is not essential. It is also possible to keep the maximum and/or minimum wall thickness more or less constant over a partial area of the periphery, for example the maximum wall thickness in the area of the inner radius of curvature over 25 to 40% of the tube periphery.

On the inner radius of curvature the wall thickness reaches 50 to 160 $\mu$m, preferably 90 to 145 $\mu$m, and the minimum of the wall thickness lies on the outer radius of curvature and shows values in the range from 10 to 50 $\mu$m, preferably 20 to 40 $\mu$m. The thicknesses apply to a casing having a water content of approximately 7 to 15% by weight and a glycerol content of 17 to 25% by weight, based on the total weight of the casing. Instead of glycerol, another or an additional plasticizer can also be present. In the case of a higher or lower content of water and softener, the values for the casing thickness are to be correspondingly increased or reduced.

It is essential for the wall thickness on the outer and inner radius of curvature to differ to as great an extent as possible. It is therefore necessary for the maximum wall thickness on the inner radius of curvature to exceed the smallest wall thickness on the outer radius of curvature by at least 50% and preferably to be at least twice as thick. The casing shows optimum characteristics if the method is carried out in such a way that the maximum wall thickness is at least three times as thick as the minimum, i.e., exceeds the minimum by 200%. In the case of a wall thickness ratio of greater than 1:9 there is a danger of the tube casing being too thin on the outer radius of curvature and bursting upon drying and/or having too great a thickness on the inner radius of curvature, in which respect the processing characteristics and the transparency of the casing suffer. The customary wall thickness ratio is maximally 1:5. The maximum wall thickness is then 400% greater than the minimum wall thickness.

When used as an artificial sausage casing, in particular as a so-called ring casing, the tube casing has the tube diameter customary for these sausages, in particular from 30 to 60 mm. However, it is also possible to achieve substantially smaller or greater diameters, for example up to 20 mm for using the skin as a curved peeling skin or up to 80 mm for types of sausage of large diameter.

The area weight of the packing casing, which is a measure of the average wall thickness, is usually 80 to 140 g/m$^2$, in particular 90 to 130 g/m$^2$. This is determined at a water content of 7 to 15% by weight and a glycerol content of 17 to 25% by weight, in each case based on the total weight of the packing casing. The packing casing is advantageously put onto the market with the said values for the water content and plasticizer content. However, it is also possible to market the casing with a significantly higher water content, so that the customer no longer has to moisten the casing before the filling procedure. Such casings usually have a moisture content of 15 to 28% by weight, based on the total weight of the casing.

As a result of the wall thickness differences on the inner and outer radius of curvature, the packing casing can be produced in a relatively small garland shape. Whereas known cellulose casings curved into a garland shape and with a tube diameter of 30 to 60 mm hitherto showed, in the moistened state, a ring inside diameter of greater than 170 mm, in particular 180 to 220 mm, the ring-shaped packing casings of the present invention show, in the moistened state and with the same tube diameter, ring inside diameters reduced to 140 mm, in particular to 120 mm. In the case of a smaller tube diameter, even smaller ring inside diameters can be achieved. A moistened state is understood to mean a tube which has been completely immersed for approximately 5 to 15 minutes in a warm water bath at 20 to 40° C.

The packing casings can of course also have customary ring inside diameters, in which case they then still have substantially more favorable expansion characteristics than the known casings. Since the packing casing is curved very uniformly, the casing shape is annular and the ring inside diameter practically constant. It can therefore be measured at any desired position.

Even in the case of a relatively small ring inside diameter, in the inflated and filled state the packing casing shows virtually no transverse wrinkles at the inside curve, i.e., in the area of the tube periphery with the greater wall thickness, so that a uniform smoke penetration through the casing is ensured upon smoking of the sausage. The casing can be sealed surprisingly using a metal clip and has a greatly reduced tendency to burst. Despite the relatively small wall thickness on the outer radius of curvature, the bursting pressure measured under identical conditions is greater, by at least 10%, in particular by at least 15%, than in a commercially available curved tube casing of unreinforced cellulose.

When pasty filling material, in particular sausage meat, is pressed in, the casing expands substantially less compared to conventional ring casings of unreinforced cellulose and has a high caliber constancy. When the sausage meat is pressed in by modern filling machines, the filling caliber set remains practically unaltered, in contrast to the known cellulose casings, even when the filling pressure is subjected to the usual variations. This pressure expansion behavior can be described by the ratio of the diameter of the casing inflated with a pressure of 10 kPa to the diameter of the casing inflated with a pressure of 30 kPa. This expansion ratio has values of between about 1:1.02 and 1:1.12. It emerges from this that the casing diameter remains practically constant in the event of small pressure changes. If, for example, in order to obtain a filling caliber of 50 to 52 mm, a sausage mixture is pressed into a sausage casing of the invention with a pressure of 20 kPa, a change of 5 kPa in the filling pressure results in a caliber change of about 0.5 to 0.7 mm, whereas, under identical filling conditions, a variation of 1.6 to 2.2 mm arises in conventional ring-shaped unreinforced cellulose casings.

The packing casing is produced by the viscose method. In this, the alkaline viscose solution is pressed out through a tubular die into a bath with acid coagulation liquid. In order to give the circular extruded viscose about its periphery a wall thickness distribution corresponding to the tubular end product, the tubular die has an appropriate mouth cross-section in the shape of an eccentric annular ring slot. The area with the greatest wall thickness lies diametrically opposite the area with the smallest wall thickness. The ring slot has, for example, a maximum opening width of about 0.8 to 1.4 mm and a minimum gap width of about 0.4 to 1.0 mm. It is also possible to use a centric ring slot, if measures are taken to ensure that the viscose has varying flow rates in the ring slot corresponding to the intended extruded wall thickness. Under these processing conditions the annular ring-shaped viscose solution emerging from the ring slot acquires a minimum wall thickness over the one half of the periphery and, diametrically opposite on the other half of the periphery, a maximum wall thickness.

Immediately after emerging from the annular ring slot, the extruded viscose solution comes into contact with the coagulation liquid. The tubular, coagulated article is passed through the coagulation bath in a conventional manner vertically downwards, but preferably vertically upwards. Shortly after leaving the annular ring slot the viscose meets the outer surface of a cylindrical pipe, a so-called spreader, which maintains the coagulating viscose tube in a circular cross-section and supports it from inside. Between the outer surface of this pipe and the extruded viscose there is a film of coagulation liquid which causes the viscose layer to coagulate from inside.

Thereafter, acid regeneration liquid is allowed to act on the coagulated tube. For this purpose the tube expediently passes through appropriate baths, until the viscose is converted completely into cellulose (cellulose hydrate gel). In contrast to the prior art, in this stage no spiral shaping of the tube casing as yet takes place.

It is particularly advantageous to carry out the coagulation and regeneration more rapidly. This is effected, for example, by increasing the acid concentration and/or the temperature of the coagulation and regeneration liquid. A further measure is the addition of hydroxycarboxylic acid to these liquids, such as is described in DE-A-3,416,406. During these treatment stages a longitudinal and transverse shrinkage of the tube is permitted. In a preferred embodiment the tube is allowed to shrink during the coagulation and regeneration stage in the longitudinal direction by about 5 to 20%, in particular 7 to 15% and in the transverse direction by about 20 to 50%, in particular 25 to 40%, compared to the dimensions upon the tubular extrusion of the viscose. In this way the ring shape obtained has particularly small inside diameters.

After regeneration the tube is washed as usual, freed of acid and salts and subjected to treatment with a plasticizer.

The tube of the cellulose hydrate gel obtained still has a very high water content and soft structure. In the concluding drying process, under the effect of heat, the water is substantially removed, preferably to values below 10% by weight, and the cellulose structure is strengthened. The heat supply required for drying is expediently effected using hot air at 80 to 140° C.

It is essential to the invention that the coagulated and regenerated tube of cellulose hydrate gel, which already has a non-uniform wall thickness as a result of the varying wall thickness of the tubular extruded viscose, undergoes stretching in the longitudinal and transverse direction in the area of its thinner wall thickness during drying. By means of this stretching an additional reduction in the wall thickness of the tube occurs. Together with this stretching, it is furthermore essential that the tube, in the area of its thicker wall thickness, undergoes a shrinkage in the longitudinal direction and a stretching in the transverse direction. The extent of the stretching in the transverse direction upon drying is preferably approximately the same over the tube periphery, so that the resulting tube has a substantially circular cross-section.

Thus, the reduction in thickness is carried out practically only in the area of the thinner wall thickness. For this purpose the tube in this area must be stretched particularly greatly in the longitudinal direction. The tube of cellulose hydrate gel is therefore wound in spiral form onto a support, care being taken to ensure that the area of the thinner tube wall is present in the area of the outer tube winding, i.e., that it extends in the area of the greater outer radius of curvature, while the area of the thicker tube wall comes into contact with the support, i.e., runs in the area of the smaller, inner radius of curvature. The area of the outer tube winding corresponds to the greater outer radius of curvature, and the area of the tube winding which comes into contact with the support corresponds to the smaller inner radius of curvature of the finished curved tube casing.

For the required properties of the tube casing it is advantageous for the latter to experience, upon drying, a longitudinal shrinkage on the inner radius of curvature of preferably about 10 to 30%, in particular 15 to 27%, based on the tube length before drying. This longitudinal shrinkage results in the finished bent tube acquiring a particularly small ring inside diameter. The longitudinal shrinkage can be seen in an orientation of the tube in the transverse direction present in the area of the inner radius of curvature. In contrast, in the area of the outer radius of curvature, the tube shows furthermore a stronger orientation in the longitudinal direction. This is a consequence of the longitudinal stretching at the outer radius of curvature upon drying, which amounts preferably to about 10 to 40%, in particular 20 to 35%, based on the tube length before drying.

During drying the tube is inflated with a gas, in particular air. By means of an appropriately high internal pressure, the thinner outer periphery of the spirally wound tube experiences a longitudinal stretching, by which means the thickness of the tube wall in this area is reduced still further. This measure is in contrast to the teaching of DE-C-2,314,767 mentioned in the introduction, according to which the thicker areas of a collagen tube are subjected to the greatest stretching. A substantially uniform transverse expansion expediently takes place over the entire periphery of the tube, by which means the tube acquires an approximately circular cross-section.

For the spiral guiding of the tube through the dryer, the roller arrangement known from DE-B-2,322,220 (FIG. 1) and consisting of axially parallel rods is, for example, suitable. These rods are driven and rotate about themselves. Moreover, the known arrangement further comprises spiral arranged rods which extend radially.

For the helical guiding of the tube a helical roller arrangement is also suitable, as is described in DE-C-650,526. It consists of guide rolls which are arranged one after the other in appropriate positions about a central drive shaft in concentric windings. They convey the tube in a manner corresponding to their arrangement. The driving of the guide rolls is effected via the central shaft, the speed of rotation of the guide rolls determining the speed at which the tube is conveyed. The conveying of the tube is assisted by additional support rolls which are arranged oblique to the screw axis, are laterally distant and freely rotatable.

A further suitable arrangement for the spiral conveying of the tube through the dryer forms the subject of DE-C-3,720,034. This arrangement comprises a cylindrical support element which is axially displaceable longitudinally and is rotatable about its own axis. It consists of a plurality of cylindrical individual segments which together form a circulating, continuous endless pipe, which constitutes a continuous, uninterrupted bearing surface of the tube.

During drying, the tube of cellulose hydrate gel is inflated to a specific internal pressure. Before and after drying, the tube passes through pairs of squeezing rollers, which prevent the escape of the supporting gas. The internal pressure must be chosen such that the diameter (measured unpressurized) of the dried tube is at least 20% greater than the diameter (measured unpressurized) before the start of drying, in particular at least 40% greater. An increase in diameter of more than 60% usually fails because of the lower strength of the tube in the area of its minimum wall thickness. When a specific internal pressure is exceeded, the tendency of the tube to burst during drying greatly increases. The higher this internal pressure is, the smaller the garland inside diameter obtained. The longitudinal and transverse stretching on the outer periphery of the tube spirals obtained by the increased internal pressure and the lower wall thickness leads to a plastic, permanent material deformation. As a result of this, the spiral shape of the tube obtained in the drying process is retained after the drying is complete. The ring inside diameter of the dried tube increases, however, upon moistening of the casing, since the expansion behavior of the cellulose changes as a result of water uptake.

Due to the stretching of the casing upon drying in the area of its minimum thickness beyond the elastic range to give a plastic permanent deformation, a casing is obtained which, compared to the conventional curved cellulose casings, has improved physical characteristics. The envisaged filling caliber is achieved even at an essentially reduced filling pressure, and is very uniform. The ring shape is also retained after the sausage mixture has been pressed in, and the tube casing then still has a very uniformly curved, annular shape. These casings can therefore be filled especially tightly with pasty filling material, in particular a sausage mixture. The sausages obtained are wrinklefree, can be evenly smoked and show no deposition of jelly. In addition, the casing surprisingly shows an increased bursting pressure, even though it has an area with a significantly reduced wall thickness.

The curved tube casing can be used as a single section or in the form of a shirred hollow rod. In order to shirr the casing, a preceding moistening to a water content of approximately 13 to 23% by weight based on the total weight is necessary. It is also possible to market the tube casing laid out flat and rolled up into a cylinder. In the tube casing laid out flat the tube areas with the minimum and maximum wall thickness extend over one another in the middle of the tube width, the tube width corresponding to half the tube periphery. The middle of the tube width lies at approximately the same distance from the two fold edges of the laid-out tube. On the peripheral half of the laid-out tube, where the minimum wall thickness extends in the middle, there are transverse folds which disappear upon filling of the tube.

Figure 1C:
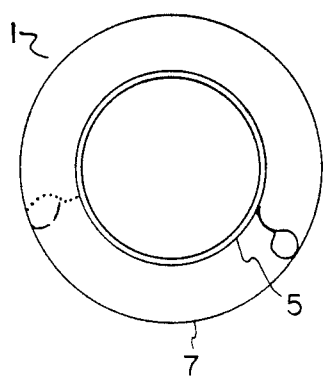
Figure 1B:
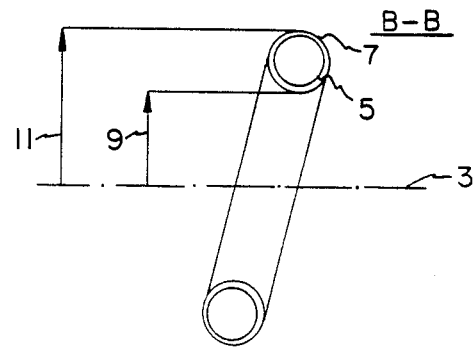

Turning now to the drawing, in FIG. 1a a casing 1 according to the present invention is shown, in the shape of a spiral having a longitudinal axis 3. In FIG. 1b, the area of greater wall thickness 5 is situated in the region defined by inner radius of curvature 9, and the area of lesser wall thickness 7 is situated directly opposite area 5 in the region defined by outer radius of curvature 11, each radius of curvature being with respect to the longitudinal axis 3. In FIG. 1c, the locations of areas 5 and 7 are shown in a longitudinal view.

The expansion behavior of the tube casing according to the invention is illustrated by the following exemplary embodiment.

The tube casing tested has, on the outer radius of curvature, a minimum wall thickness of approximately 26 to 28 micrometers and, on the inner radius of curvature, a maximum wall thickness of 128 to 130 micrometers. In the laid-out state the casing has transverse folds on the one half of the periphery in the middle of which the outer radius of curvature extends. These folds disappear upon inflating or filling the casing. When the moistened tube casing is inflated with air at a pressure of 20 kPa or filled in the moistened state with filling material, then it is bent circular, and the ring inside diameter is approximately 160 to 170 mm. Its unit area weight amounts to 100 g/m². It was produced using the method described above.

During the coagulation and regeneration the shrinkage was 11% in the longitudinal direction and 28% in the transverse direction. The peripheral expansion of the dried tube was 45% compared to the tube periphery directly before drying. During drying the tube in the area of the inner radius of curvature shrunk by about 20% in the longitudinal direction, while it was stretched in the area of the outer radius of curvature by about 30% in the longitudinal direction. The casing shows on the outer radius of curvature a stronger orientation in the longitudinal direction, but on the inner radius of curvature a stronger orientation in the transverse direction. The orientation was determined by measuring the double refraction. The ring inside diameter of the dried tube was 135 mm (inflated with air, pressure 20 kPa).

In order to determine the expansion behavior, before pressure application the casing is soaked for about 10 minutes in warm water at approximately 30° C. The ring inside diameter of the moistened casing increased to 175 mm (inflated with air, pressure 20 kPa). The increase in the caliber, starting from approximately 47 mm, by increasing the internal pressure in the casing using compressed air is shown in the diagram (curve A). In the diagram the internal pressure in the casing (abscissa) in kPa is plotted against the caliber (ordinate) in millimeters.

For comparison, the expansion behavior of a ring casing of the same material and with the same caliber is tested, this garland skin having acquired its curved form on regeneration of the cellulose according to DE-C-932,713 (diagram curve B). Its wall thickness on the outer radius of curvature is approximately 55 to 58 micrometers, and on the inner radius of curvature approximately 60 to 62 micrometers. In contrast to the casing according to the invention, this previously described casing shows a slight orientation in the longitudinal direction on the inner radius of curvature.

If the tube casing according to the invention is to achieve the same filling caliber as the previously described tube casing at the same filling pressure, then before filling it must have a greater caliber than the previously described tube casing. The diagram shows the expansion behavior of a casing according to the invention (curve C) which, starting from a caliber of approximately 49 mm (in the moistened state), achieves the filling caliber of the previously described casing (curve B) at an internal pressure of approximately 24 kPa.

It emerges from the diagram (curves A and C) that the tube casing according to the invention undergoes a substantially slower increase in the caliber (lower expansion) than the previously described casing (curve B) at the same filling pressure change. Thus, in the casing according to the present invention, slight variations in the filling pressure have hardly any effect on the filling caliber of the sausage produced, whereas, in the previously described casing, a constant filling pressure is required in order to achieve a high degree of caliber constancy.

What is claimed is:

1. A curved tubular packing casing comprising unreinforced cellulose which has a nonuniform peripheral wall thickness, wherein the area of the tube periphery having the greater wall thickness is situated in the region defined by the inner radius of curvature of the tube and the area of lesser wall thickness is situated opposite said area of greater wall thickness in the region defined by the outer radius of curvature of the tube, and wherein the maximum wall thickness is at least 50% greater than the minimum wall thickness.

2. The packing casing as claimed in claim 1, wherein said maximum wall thickness is about 200 to 800% greater than said minimum wall thickness.

3. The packing casing as claimed in claim 2, wherein said casing is curved into a garland shape having an inside diameter not exceeding 220 mm when wetted and inflated to a pressure of 20 kPa.

4. The packing casing as claimed in claim 3, wherein said inside diameter does not exceed 180 mm.

5. The packing casing as claimed in claim 3, wherein said inside diameter does not exceed 160 mm.

6. The packing casing as claimed in claim 2, having an area weight of about 80 to 140 g/m².

7. The packing casing as claimed in claim 6, having an area weight of 90 to 130 g/m².

8. The packing casing as claimed in claim 1, wherein said casing comprises about 7 to 15 wt % water and about 17 to 25 wt % glycerol, based on total weight, and wherein said maximum wall thickness is about 50 to 160 μm and said minimum wall thickness is about 10 to 50 μm.

9. The packing casing as claimed in claim 8, wherein said maximum wall thickness is 90 to 145 μm and said minimum wall thickness is 20 to 40 μm.

10. The packing casing as claimed in claim 1 having a tube diameter of about 20 to 80 mm.

11. The packing casing as claimed in claim 10, having a tube diameter of 30 to 60 mm.

12. A sausage product comprising a sausage meat emulsion and a packing casing as claimed in claim 1.

* * * * *